(12) United States Patent
Mignone

(10) Patent No.: US 6,308,617 B1
(45) Date of Patent: Oct. 30, 2001

(54) DEVICE FOR BINDING ROASTS, SAUSAGES AND THE LIKE BY MEANS OF ELASTIC RINGS

(76) Inventor: Giuseppe Mignone, Frazione San Matteo Fondo 38, Cisterna d'Asti (Asti) (IT)

( * ) Notice: Subject to any disclaimer, the term of this patent is extended or adjusted under 35 U.S.C. 154(b) by 0 days.

(21) Appl. No.: 09/586,914

(22) Filed: Jun. 5, 2000

(30) Foreign Application Priority Data

Jun. 4, 1999 (EP) ................................. 99830350

(51) Int. Cl.[7] ..................... A23L 1/00; A47J 37/00; A22C 7/00; B65B 25/22; B65B 41/04
(52) U.S. Cl. ..................... 99/350; 99/419; 99/421 H; 99/441; 24/16 R; 53/439; 100/4; 100/7; 100/14
(58) Field of Search ............................... 99/339, 340, 350, 99/419–421 V, 426, 427, 441, 444–450; 126/25 R, 9 R, 41 R; 211/181.1; 24/16 R, 305 R; 53/439, 466, 449; 100/4, 7, 14, 27; 426/105, 129, 412–414, 420, 523; 241/222

(56) References Cited

U.S. PATENT DOCUMENTS

| 3,386,370 | 6/1968 | Brown | 100/4 |
| 3,823,442 | 7/1974 | Ferrara | 24/16 |
| 4,621,482 | 11/1986 | Crevasse | 53/439 |
| 5,445,063 | * 8/1995 | Sherman | 99/419 X |

FOREIGN PATENT DOCUMENTS

| 420 900 | 9/1966 | (CH) . |
| 42 01 863 A 1 | 1/1992 | (DE) . |

* cited by examiner

Primary Examiner—Timothy F. Simone
(74) Attorney, Agent, or Firm—Joseph W. Molasky & Associates

(57) ABSTRACT

Device for binding roasts, sausages and the like, comprising a vertical rod having a clamp and a threaded rod with a control knob for fixing the vertical rod to the table, wherein: a concave element, suitable for containing the "roasts" to be bound by the elastic rings, is fixed on the top of the vertical rod; below being provided a parallel rod iron having an invitation bending; below said element and relative rod iron being provided a device carrying the elastic rings, i.e. three rod irons forming together a bracket, arranged two in the upper part and one in the lower, between said rod irons being provided a fourth rod iron, as an independent spring, for maintaining tidy said elastic rings.

5 Claims, 3 Drawing Sheets

DEVICE FOR BINDING ROASTS, SAUSAGES AND THE LIKE BY MEANS OF ELASTIC RINGS

BACKGROUND OF THE INVENTION

This invention relates to a device for binding a meat product such as a roast or sausage and the like by means of elastic rings.

It is known that small butchers, or artisans working in this field prepare small quantities of roast chicken, rabbit and/or pork by rolling the meat into a roundish shape and binding it with hemp, string or elastic rings. In this way, the meat retains its original shape and compactness during cooking, and it arrives at table in the best of condition for cutting.

This same procedure applies to various salted meats and sausages where the consumer or manufacturer wants to use binding with string or elastic rings for aesthetic reasons or better cooking.

Currently, this binding with string and/or rings is performed manually, by holding the meat roll or sausage with one hand and applying the string and/or elastic rings with the other; however, this is inconvenient and time-consuming and, in many cases, it is difficult to perform.

SUMMARY OF THE INVENTION

It is an object of this invention to overcome these drawbacks by providing a device which makes it easier to perform the applying of elastic rings to meat rolls and/or sausages and facilitates their removal once the meat is served.

The essential characteristics of the present invention will become evident from the following description.

BRIEF DESCRIPTION OF THE DRAWINGS

This invention will now be described in detail by reference to the attached drawings.

DETAILED DESCRIPTION OF THE PREFERRED EMBODIMENTS

Figure 1:
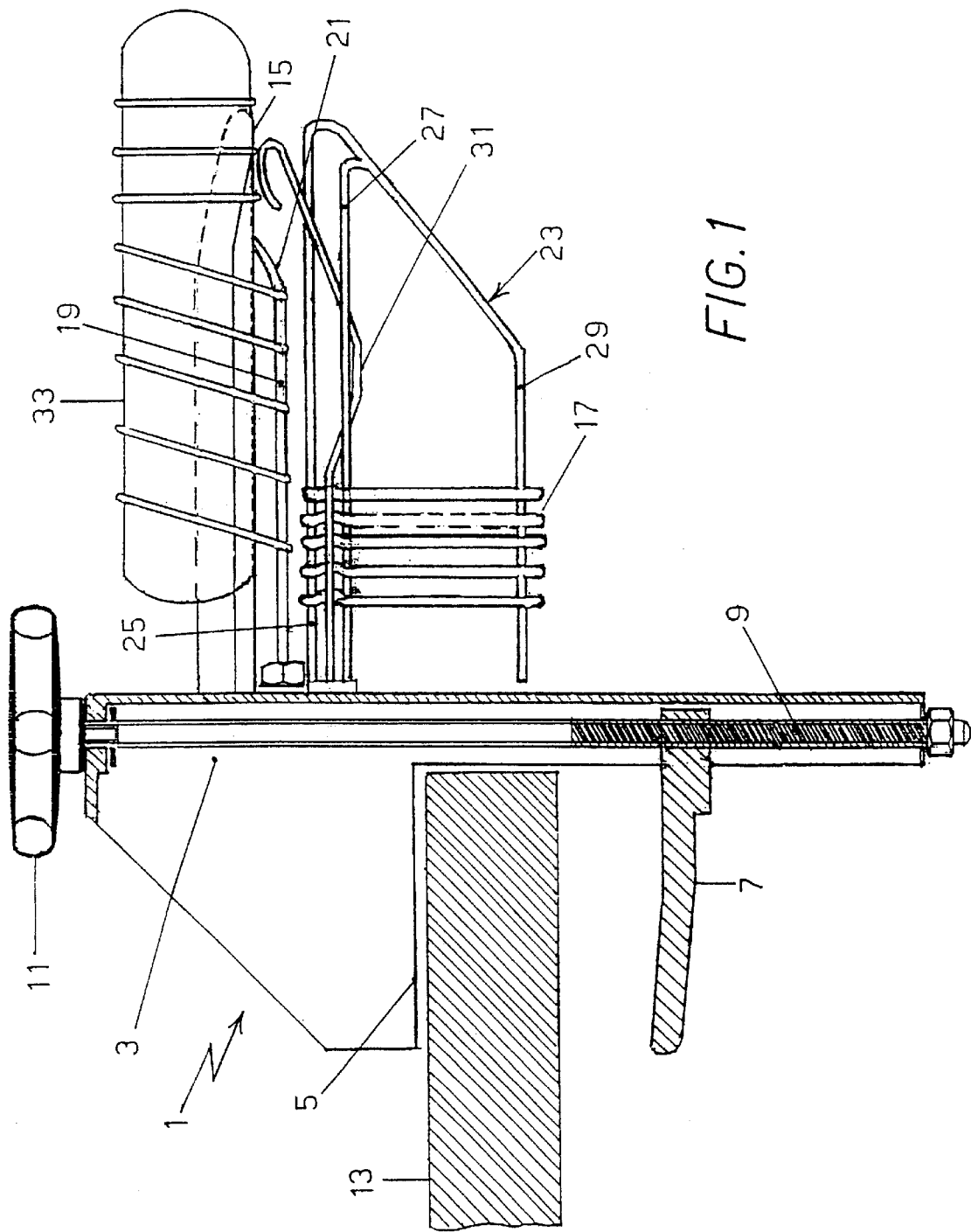
FIG. 1 is a side elevational view of the device of this invention shown with a large roast.

As is evident from the drawings, the present device 1, comprises a vertical rod 3 having a rectangular base 5 provided with a clamp 7 which slides into said base. The clamp is operated by a threaded rod 9, said threaded rod 9 having a knob 11, integral to it, for securing the clamp 7 to a working table 13.

A concave element 15, made of stainless steel, is fixed perpendicularly on top of the vertical rod 3, for containing the "roast", small ones as well as large ones, to be bound with the elastic rings 17, as will be described later.

Below said concave element 15, a support rod 19 is provided running parallel thereto having a front part 21 outwardly bending upwards.

A ring holder 23 for carrying the elastic rings 17 is disposed below the concave element 15 and support rod 19. This ring-holder 23 is comprised of three stainless stool ring-rods 25, 27 and 29 all of which lie parallel to one another and two of which, 25 and 27, are closely adjacent.

Disposed between rods 25 and 27 is a leaf-rod 31, the object of which is to maintain the elastic rings 17 in orderly fashion on ring-holder 23. The leaf-rod 31 is comprised of three segments, the first of which lies parallel to ring-rods 25 and 27.

The second extends downwardly and then upwardly to form a curved segment which, in profile, has a generally U-shaped appearance, and the third segment is an upwardly extending hook-shaped terminal end portion. The leaf-rod 31 is in a constrained mode and it exerts on the rings 17 a resilient force which keeps them in place, in the orderly position shown in FIGS. 1, 2 and 3.

The term "roast(s)" comprise, here, every kind of meat or sausage small or large, which can be bound with the elastic rings 17.

Figure 2:
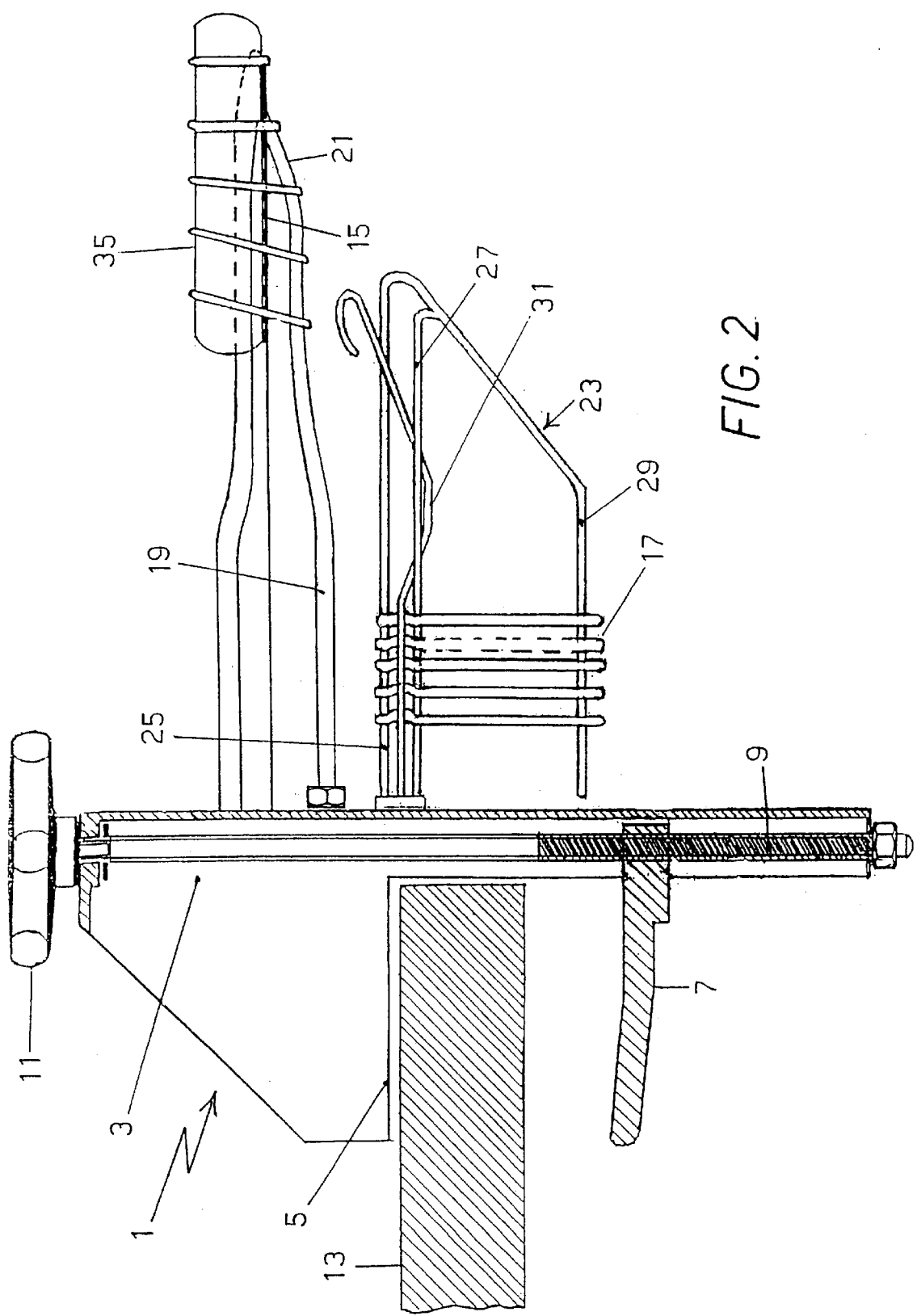
FIG. 2 is a side elevational view of the device of this invention shown with a roast which is small in size.
Figure 3:
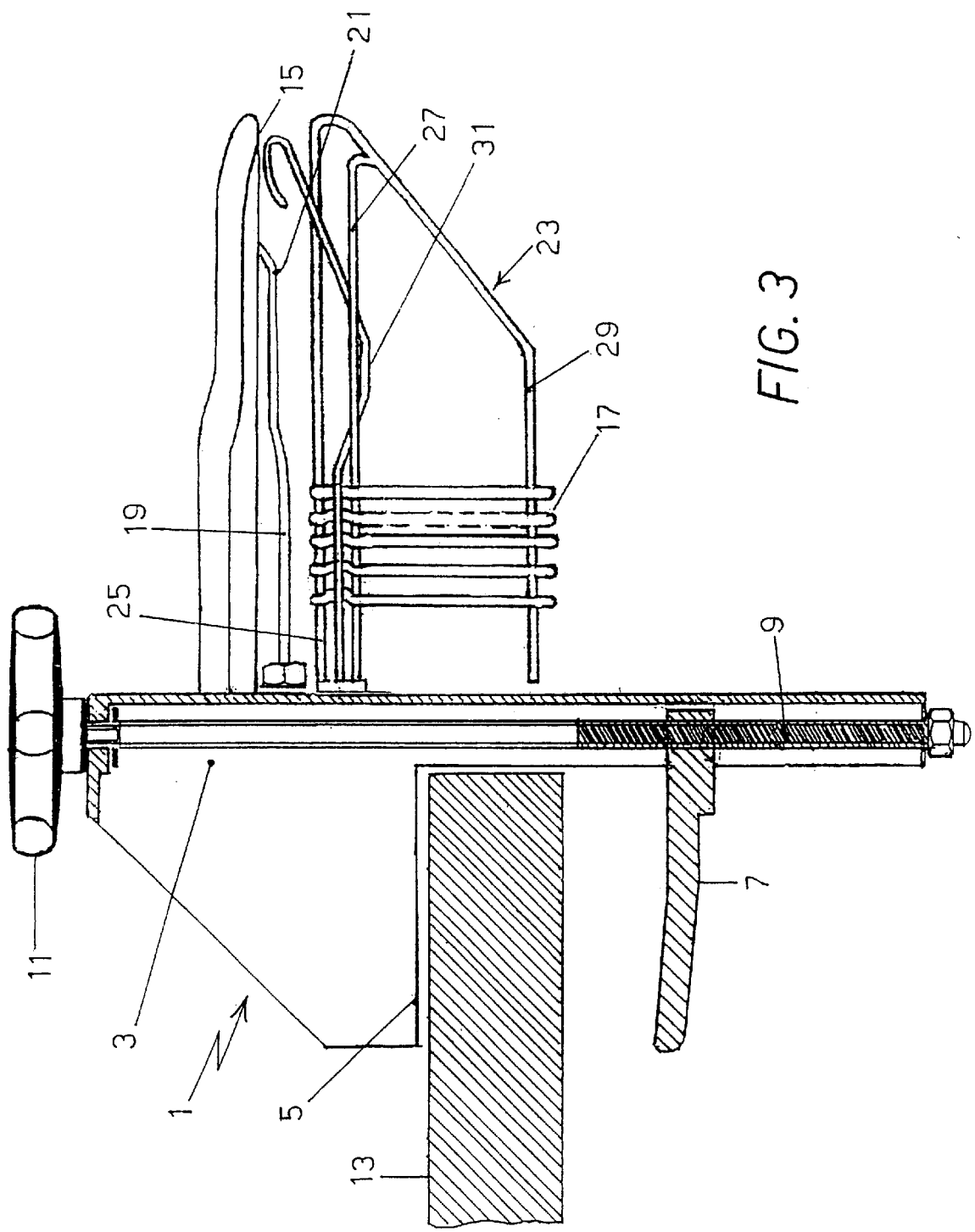
FIG. 3 is a side elevational view of the device of this invention shown without a roast 4 or meat product.

FIG. 1 shows a large roast 33, and FIG. 2 a small roast 35; both bound by the elastic rings 17. This operation and the eventual removal of the roast from the device is best illustrated via a step-by-step description of the process.

After having been applied to the table 13 by the clamp 7, the concave element 15 and the ring holder 23 containing elastic rings 17 are oriented towards the user. The roast 33 (35) is placed on the concave element 15 and the user withdraws the elastic rings 17 easily and rapidly from the holder 23 and places them around the roast 33 (35). The securing of the elastic rings around the roast is facilitated by tension rod 19, the end segment of which extends upwardly and comes into resilient contact with concave element 15.

Once the roast 33 (35) is bound with the desired number of elastic rings 17 it is extracted from the concave element 15. During the extraction step, the drawing of the elastic rings 17 is restrained due to the friction created by the sliding of the rings on tension rod 19. As a result, rod 19 serves as a tightening means for the elastic rings 17. As shown in FIGS. 1 and 2, the rings are in an inclined mode on rod 19, but once they are drawn off the rod, they return to their original position and they are essentially perpendicular to the roast axis.

What is claimed is:

1. A device for binding a meat product comprising:
    a vertical rod having a rectangular base provided with a clamp which slidingly engages said base and is operated by a threaded rod, said threaded rod having a control knob for securing the clamp to a table;
    a concave element, secured perpendicularly to the top part of said vertical rod, suitable for containing said roasts or sausages with elastic rings;
    a tension rod secured to said vertical rod, said tension rod being disposed below said concave element and having a front portion which extends upwardly;
    a ring holder for carrying said elastic rings, said holder being secured to said vertical rod and being disposed below said concave element and said tension rodand comprising three parallel rods which are perpendicular to the vertical rod and form together a ring holder, two of said rods being adjacent in the upper part and the third rod being in the lower part; and
    a leaf rod secured to said vertical rod and having a first portion parallel to the initial portions of said three rods, a second portion bent downwards, a third portion bent upwards, and an upwardly hook-shaped terminal portion for keeping the elastic rings in order.

2. The device according to claim 1, wherein said concave element and said ring holder are oriented towards the user to facilitate the withdrawal of the elastic rings for placement about said meat product.

3. The device according to claim 1 wherein the placing of said elastic rings about said meat product is facilitated by the presence, beneath the concave element, of a tension rod whose curved end segment extends upwardly and resiliently engages said concave element.

4. The device according to claim 1 constructed of stainless steel.

5. The device according to claim 1 wherein the removal of the elastic rings from a meat product is restrained by their frictional engagement with said tension rod, as a result of which, they are consequently inclined and once removed from said tension rod, they are returned to their original position, substantially perpendicular to the roast axis.

* * * * *